(12) United States Patent
Kroeger et al.

(10) Patent No.: US 11,472,564 B2
(45) Date of Patent: Oct. 18, 2022

(54) SEAL ARRANGEMENT

(71) Applicant: Rohr, Inc., Chula Vista, CA (US)

(72) Inventors: Daniel Kroeger, San Diego, CA (US); Stephen Lindsey, Chula Vista, CA (US); Kristopher B. Shaner, San Diego, CA (US); Jihad Ramlaoui, Chula Vista, CA (US)

(73) Assignee: Rohr, Inc., Chula Vista, CA (US)

( * ) Notice: Subject to any disclaimer, the term of this patent is extended or adjusted under 35 U.S.C. 154(b) by 814 days.

(21) Appl. No.: 16/299,327

(22) Filed: Mar. 12, 2019

(65) Prior Publication Data

US 2020/0290746 A1 Sep. 17, 2020

(51) Int. Cl.
*B64D 29/08* (2006.01)

(52) U.S. Cl.
CPC .................................. *B64D 29/08* (2013.01)

(58) Field of Classification Search
CPC ................................ B64D 29/00; B64D 29/08
See application file for complete search history.

(56) References Cited

U.S. PATENT DOCUMENTS

| | | | |
|---|---|---|---|
| 8,181,905 B2 | 5/2012 | McDonough et al. | |
| 9,784,213 B2 | 10/2017 | Todorovic | |
| 10,570,764 B2 * | 2/2020 | Khidekel | F16J 15/027 |
| 10,648,408 B2 * | 5/2020 | Takeuchi | B64D 29/00 |
| 10,718,269 B2 * | 7/2020 | Takeuchi | B64D 27/26 |
| 10,900,368 B2 * | 1/2021 | De Pau, Jr. | F16J 15/027 |
| 10,947,904 B2 * | 3/2021 | Olson | B64D 29/06 |
| 11,066,179 B2 * | 7/2021 | Ramlaoui | B64D 29/00 |
| 11,313,323 B2 * | 4/2022 | Boileau | F02K 1/72 |
| 2001/0027884 A1 | 10/2001 | Dennison | |
| 2011/0024994 A1 | 2/2011 | Bunel | |
| 2012/0097261 A1 | 4/2012 | Porte | |
| 2013/0323013 A1 | 12/2013 | Mercier | |
| 2018/0281871 A1 | 10/2018 | Yamamoto | |
| 2021/0269168 A1 * | 9/2021 | Shaner | B32B 3/12 |

OTHER PUBLICATIONS

EP search report for EP19212471.7 dated Jul. 1, 2020.

* cited by examiner

*Primary Examiner* — Magdalena Topolski
(74) *Attorney, Agent, or Firm* — Getz Balich LLC

(57) ABSTRACT

A seal arrangement includes a first outer skin and a second outer skin disposed about an axial centerline. The second outer skin is adjacent the first outer skin and includes at least one door. A bulkhead extends substantially radially at least a portion of a distance between the axial centerline and one of the first outer skin and the second outer skin. A first outer frame includes a first portion, a second portion, and a third portion. The first portion of the first outer frame is mounted to the bulkhead. A seal is mounted to one of the at least one door and the second portion. The at least one door is rotatable between a first position and a second position. In the second position the seal contacts the at least one door and the second portion. The third portion is configured to limit a compression of the seal.

11 Claims, 9 Drawing Sheets

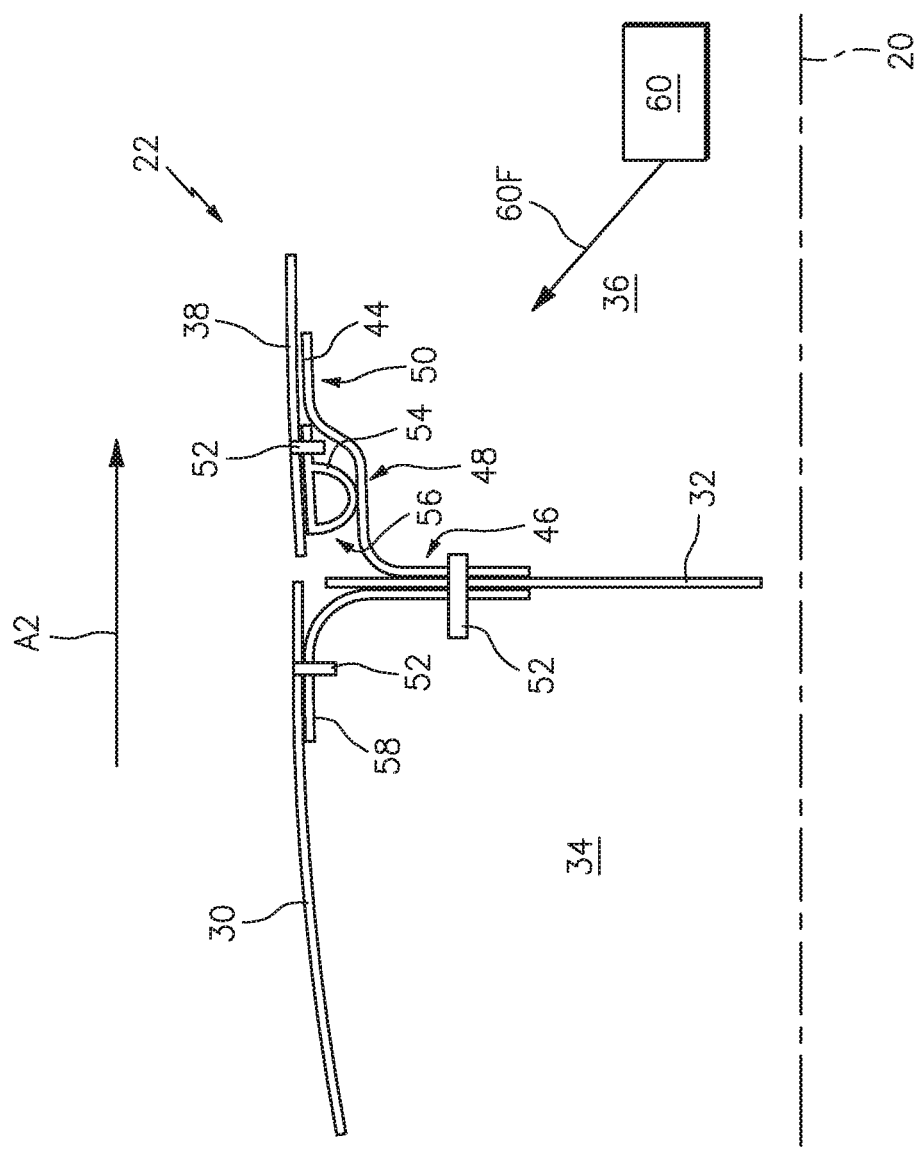

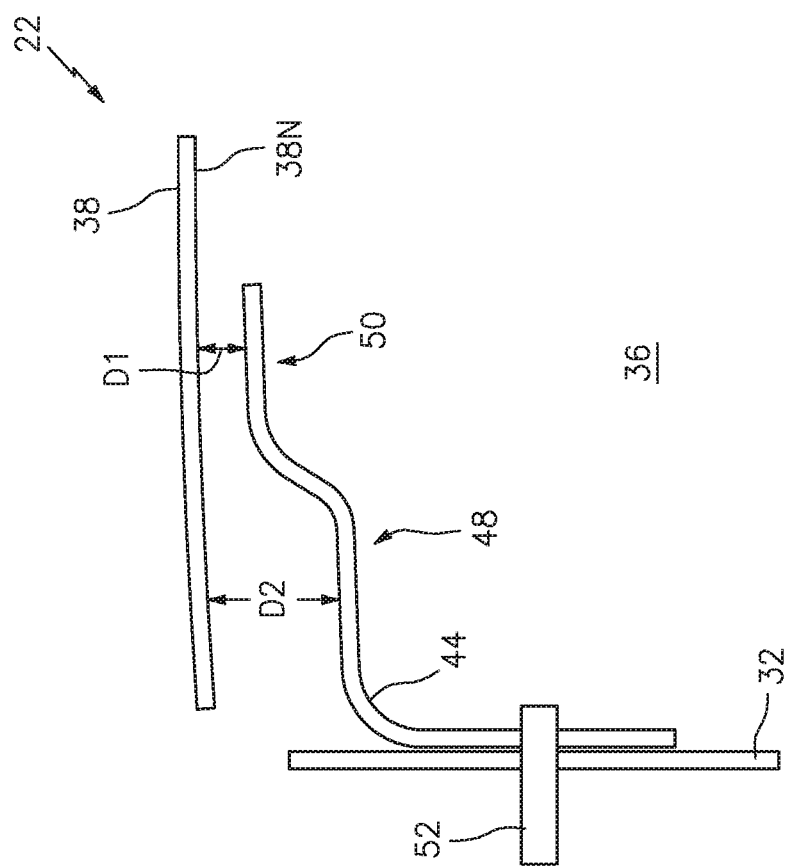

SEAL ARRANGEMENT

BACKGROUND

1. Technical Field

This disclosure relates generally to gas turbine engine nacelles, and more particularly to cowl door seals.

2. Background Information

A gas turbine engine may generally include a nacelle which forms an exterior housing of the engine. The nacelle may define one or more compartments within the structure of the nacelle, for example, a fan compartment disposed proximate a fan of the engine. One or more cowl doors may be disposed on the outer barrel of the nacelle to provide access to the compartments. Compartments of the nacelle may contain engine equipment such as pressurized fluid lines (e.g., compressor bleed air, fuel, etc.), electrical equipment, mechanical equipment, etc. Fluids contained within the pressurized fluid lines may have high temperatures and pressures which could be released into the respective compartment as a result of a rupture (i.e., a "burst duct"). Further, electrical and mechanical equipment within the compartments may be susceptible to fires.

Some components of the aircraft of gas turbine engine may be sensitive to effects of fire and/or burst ducts. For example, the interface between the nacelle inlet and the fan cowl doors may be susceptible to fires and/or fluids introduced from a burst duct or from a source external to the gas turbine engine. Thus, it may be necessary to contain the effects of these hazardous conditions within the associated compartment or to prevent the ingress of the conditions to an unaffected compartment. Further, conditions internal or external to the compartment may affect the sealing capability of the associated cowl door seal assembly. Accordingly, a need exists for an improved cowl door seal.

SUMMARY

According to an embodiment of the present disclosure, a seal arrangement includes a first outer skin and a second outer skin disposed about an axial centerline. The second outer skin is adjacent the first outer skin and includes at least one door. A bulkhead extends substantially radially at least a portion of a distance between the axial centerline and one of the first outer skin and the second outer skin. A first outer frame includes a first portion, a second portion, and a third portion. The first portion of the first outer frame is mounted to the bulkhead. A seal is mounted to one of the at least one door and the second portion. The at least one door is rotatable between a first position and a second position. In the second position the seal contacts the at least one door and the second portion. The third portion is configured to limit a compression of the seal between the at least one door and the second portion.

In the alternative or additionally thereto, in the foregoing embodiment, the seal is configured to form a seal effect between the at least one door and the second portion when the at least one door is in the second position.

In the alternative or additionally thereto, in the foregoing embodiment, the third portion is spaced from the at least one door a first distance and the second portion is spaced from the at least one door a second distance different than the first distance.

In the alternative or additionally thereto, in the foregoing embodiment, the second distance is greater than the first distance.

In the alternative or additionally thereto, in the foregoing embodiment, the at least one door and the first outer frame are made from a same material.

In the alternative or additionally thereto, in the foregoing embodiment, the first outer frame is annularly disposed about the axial centerline.

In the alternative or additionally thereto, in the foregoing embodiment, the seal arrangement further includes a second outer frame mounted to each of the first outer skin and the bulkhead opposite the bulkhead from the first outer frame. The second outer frame is annularly disposed about the axial centerline.

In the alternative or additionally thereto, in the foregoing embodiment, the second outer frame is made of a different material than the first outer frame and the at least one door.

In the alternative or additionally thereto, in the foregoing embodiment, the seal is configured to maintain the sealing feature during an outward radial deflection of the at least one door.

According to another embodiment of the present disclosure, a gas turbine engine includes a first outer skin and a second outer skin disposed about an axial centerline of the gas turbine engine and forming portions of a nacelle of the gas turbine engine. The second outer skin includes at least one cowl door. A bulkhead extends substantially radially at least a portion of a distance between the axial centerline and one of the first outer skin and the second outer skin. A first outer frame includes a first portion, a second portion, and a third portion. The first portion of the outer frame is mounted to the bulkhead. A seal is mounted to one of the at least one cowl door and the second portion. The at least one cowl door is rotatable between a first position and a second position. In the second position the seal is in contact with the at least one cowl door and the second portion. The third portion is configured to limit a compression of the seal between the at least one cowl door and the second portion.

In the alternative or additionally thereto, in the foregoing embodiment, the seal is configured to form a seal effect between the at least one cowl door and the second portion when the at least one cowl door is in the second position.

In the alternative or additionally thereto, in the foregoing embodiment, the third portion is spaced from the at least one cowl door a first distance and the second portion is spaced from the at least one cowl door a second distance different than the first distance.

In the alternative or additionally thereto, in the foregoing embodiment, the second distance is greater than the first distance.

In the alternative or additionally thereto, in the foregoing embodiment, the at least one cowl door and the first outer frame are made from a same material.

In the alternative or additionally thereto, in the foregoing embodiment, the gas turbine engine further includes a second outer frame mounted to each of the first outer skin and the bulkhead opposite the bulkhead from the first outer frame. The second outer frame is annularly disposed about the axis. The second outer frame is made of a different material than the first outer frame and the at least one cowl door.

In the alternative or additionally thereto, in the foregoing embodiment, the seal is configured to maintain the seal effect during an outward radial deflection of the at least one cowl door.

According to another embodiment of the present disclosure, an aircraft includes at least one gas turbine engine. The at least one gas turbine engine includes a first outer skin and a second outer skin disposed about an axial centerline of the at least one gas turbine engine and forming portions of a nacelle of the at least one gas turbine engine. The second outer skin includes at least one cowl door. A bulkhead extends substantially radially at least a portion of a distance between the axial centerline and one of the first outer skin and the second outer skin. A first outer frame includes a first portion, a second portion, and a third portion. The first portion of the first outer frame is mounted to the bulkhead. A seal is mounted to one of the at least one cowl door and the second portion. The at least one cowl door is rotatable between a first position and a second position. In the second position the seal is in contact with the at least one cowl door and the second portion. The third portion is configured to limit a compression of the seal between the at least one cowl door and the second portion.

In the alternative or additionally thereto, in the foregoing embodiment, the seal is configured to form a seal effect between the at least one cowl door and the second portion when the at least one cowl door is in the second position.

In the alternative or additionally thereto, in the foregoing embodiment, the third portion is spaced from the at least one cowl door a first distance and the second portion is spaced from the at least one cowl door a second distance different than the first distance.

In the alternative or additionally thereto, in the foregoing embodiment, the second distance is greater than the first distance.

The present disclosure, and all its aspects, embodiments and advantages associated therewith will become more readily apparent in view of the detailed description provided below, including the accompanying drawings.

BRIEF DESCRIPTION OF THE DRAWINGS

FIG. 4 illustrates an exemplary embodiment of a seal arrangement.

FIG. 4A illustrates a view of the seal arrangement of FIG. 4.

DETAILED DESCRIPTION

Figure 1:
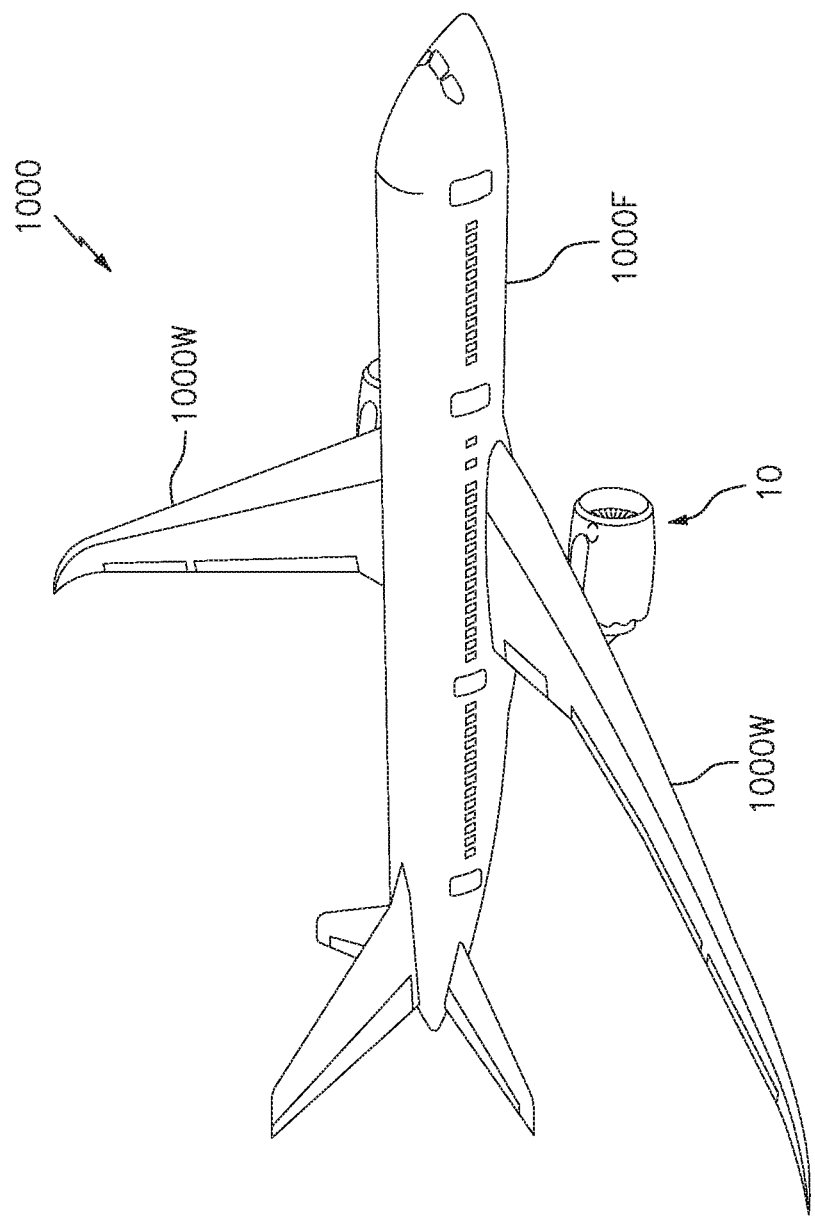
FIG. 1 illustrates a perspective view of an aircraft including a gas turbine engine.

It is noted that various connections are set forth between elements in the following description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

Figure 2:
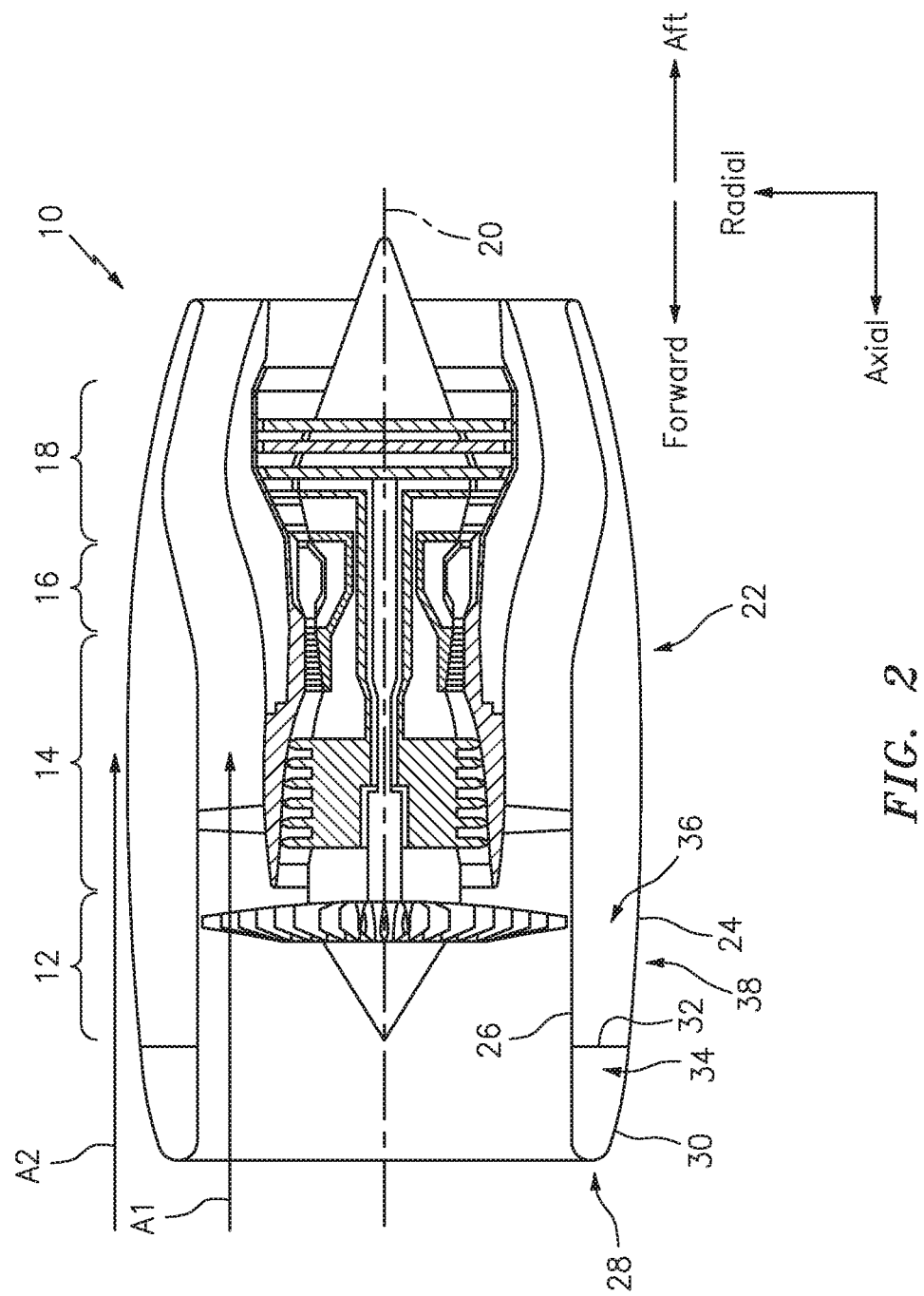
FIG. 2 illustrates a side, cross-sectional view of a gas turbine engine.

Referring to FIGS. 1 and 2, an aircraft 1000 includes a gas turbine engine 10 mounted to, for example, a wing 1000W or a fuselage 1000F of the aircraft 1000. The gas turbine engine 10 generally includes a fan section 12, a compressor section 14, a combustor section 16, and a turbine section 18 disposed about an axial centerline 20. The gas turbine engine 10 further includes a nacelle 22 defining a housing of the gas turbine engine 10 about the axial centerline 20.

The nacelle 22 includes an outer barrel 24 defining a radially outermost surface of the nacelle 22 and an inner barrel 26 defining a radially innermost surface of the nacelle 22. The nacelle 22 further includes an inlet portion 28 disposed at a forward end of the nacelle (i.e., including forward portions of the outer barrel 24 and the inner barrel 26). The inlet portion 28 includes an inlet skin 30 forming a leading edge of the gas turbine engine 10 as well as both inner and outer surfaces of the nacelle 22. The inlet skin 30 is configured to direct airflow A1 into the fan section 12 of the gas turbine engine 10 while airflow A2 passes outside the nacelle 22. An inlet bulkhead 32 extends between the outer barrel 24 (e.g., inlet portion 28) and the inner barrel 26 defining a forward compartment 34 within the inlet portion 28. For example, the inlet bulkhead 32 may extend substantially radially between the outer barrel 24 and the inner barrel 26.

The nacelle 22 may include a fan compartment 36 axially aft of the forward compartment 34 between the outer barrel 24 and the inner barrel 26. The outer barrel 24 may include one or more cowl doors 38 forming a portion of the outer barrel 24 and configured to allow access to the fan compartment 36 from a position external to the gas turbine engine 10. While the present disclosure will be explained with reference to fan compartment cowl doors, those of ordinary skill in the art will recognize that the present disclosure is also applicable to other cowl doors, access panels, etc. configured to permit access to internal components of the gas turbine engine 10 or other equipment (e.g., industrial gas turbine engines, wind turbines, etc.). For example, in some embodiments, the cowl door 38 may be configured to permit access to one or more of the fan section 12, the compressor section 14, the combustor section 16, the turbine section 18, or another other part of the gas turbine engine 10 (e.g., thrust reversal compartment).

Figure 3:
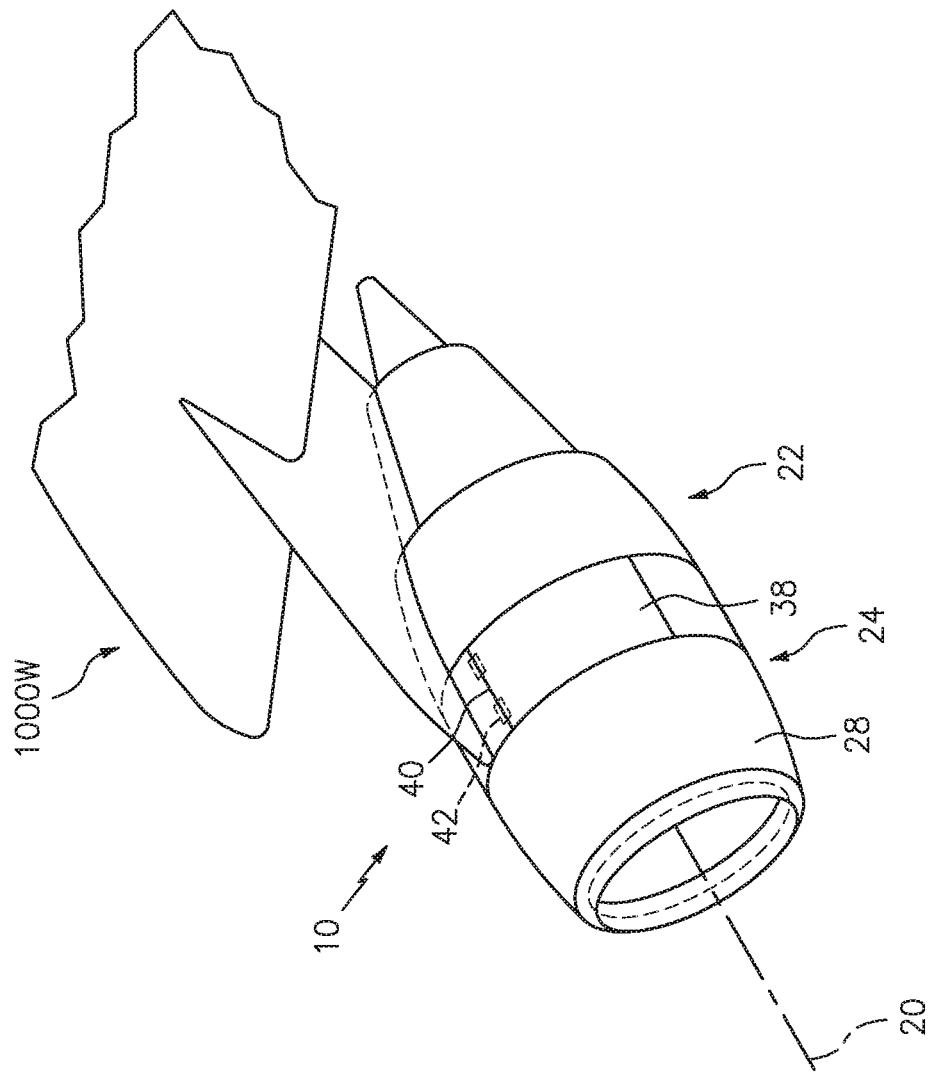
FIG. 3 illustrates a perspective view of an exterior of a gas turbine engine.

FIG. 3 illustrates the cowl door 38 disposed in the outer barrel 24 aft of the inlet portion 28. The cowl door 38 may be rotatable between two or more positions. For example, the cowl door 38 may be rotatable between a closed position and an open position. As used herein, a "closed position" will be used to refer to the cowl door 38 in a position so as to form a substantially continuous exterior surface of the outer barrel 24 (e.g., the at least one cowl door 38 is positioned for flight). The "open position" will be used to refer to the cowl door 38 in a position other than the closed position (e.g., the cowl door 38 is partially open, fully open, etc.). The cowl door 38 may be rotatable about, for example, a hinge axis 40 of the outer barrel 24. One or more hinges 42 (e.g., gooseneck hinges) may rotatably mount the cowl door 38 to the outer barrel 24 thereby allowing rotation about the hinge axis 40.

Referring to FIGS. 4 and 4A-C, the nacelle 22 includes a first outer frame 44 disposed within the fan compartment 36 between the inlet bulkhead 32 and the cowl door 38. The first outer frame 44 includes a first portion 46, a second portion 48, and a third portion 50. The first portion 46 of the first outer frame 44 is mounted to the inlet bulkhead 32 by one or more mounting fixtures 52 which may be any suitable fixture for mounting the first outer frame 44 to the inlet bulkhead 32. In some embodiments, the first portion 46 may be configured as a flange for mounting to the inlet bulkhead 32. In some embodiments, the first outer frame 44 may be an annular frame extending from the inlet bulkhead 32 about the axial centerline 20. In some other embodiments, the first outer frame 44 may be a partially-annular frame, for example, the first outer frame 44 may extend from the inlet bulkhead 32 proximate the cowl door 38 (e.g., the first outer frame 44 may be formed around a portion of a circumference of an inner surface of the outer barrel 24 corresponding to a location of the cowl door 38). As shown in FIGS. 4 and 4A-C, the second portion 48 may be proximate the inlet bulkhead 32 with respect to the third portion 50.

In some embodiments, one or both of the second portion 48 and the third portion 50 may be substantially perpendicular to the first portion 46. In some embodiments, the second portion 48 may be substantially parallel to the third portion 50. In some embodiments, one or both of the second portion 48 and the third portion 50 may be substantially parallel to a respective radially-opposite portion of the cowl door 38. As used herein, the term "substantially" with regard to an angular relationship refers to the noted angular relationship +/−10 degrees.

In some embodiments, the nacelle 22 may include a second outer frame 58 disposed within the forward compartment 34 and mounted between the inlet bulkhead 32 and the inlet portion 28 of the outer barrel 24 by one or more mounting fixtures 52. The second outer frame 58 may be annularly disposed about the axial centerline 20 so as to extend about the entire interface between the inlet bulkhead 32 and the outer barrel 24. In some embodiments, the second outer frame 58 may form a seal between the forward compartment 34 and the interface between the inlet bulkhead 32 and the outer barrel 24.

The nacelle 22 may include a seal 54 configured to form a seal effect 56 (e.g., a fluid seal, a fire seal, etc.) between the cowl door 38 and the first outer frame 44 when the cowl door 38 is in a closed position. For example, the seal 54 may form the seal effect 56 between in interior surface of the cowl door 38 and the second portion 48 of the first outer frame 44 when the cowl door 38 is in a closed position. In some embodiments, the seal 54 may be mounted to the cowl door 38 and/or outer barrel 24 by one or more mounting fixtures 52 (as shown in FIG. 4). In some other embodiments, the seal 54 may be mounted to, for example, the second portion 48 of the first outer frame 44 (see FIG. 5). The seal 54 may be any suitable seal such as but not limited to, for example, a P seal or an omega seal (as illustrated in FIGS. 4 and 5, respectively).

The first outer frame 44 and associated seal effect 56 may be configured to contain hazardous conditions occurring within the fan compartment 36 from spreading to other portions of the gas turbine engine 10 (e.g., the forward compartment 34). For example, the seal effect 56 may contain the harmful effects of fires and burst ducts within the fan compartment 36. To illustrate an exemplary fire within the fan compartment 36, fire 60 is shown in FIG. 4 including heat, flames, and/or smoke 60F radiating towards the first outer frame 44. Thus, the first outer frame 44 may reduce or prevent the escape or transmission of said heat, flames, and/or smoke 60F from the fan compartment 36. The first outer frame 44 may similarly contain the fluid and increased pressure, resulting from a burst duct, within the fan compartment 36. In some embodiments, the seal 54 may be configured to reduce or prevent ingress or egress of fluids to or from the fan compartment 36 between the cowl door 38 and the first outer frame 44.

FIG. 4A illustrates a portion of the nacelle 22 with the seal 54 omitted for clarity. The nacelle 22 includes a distance D1 between an interior surface of the cowl door 38 and the third portion 50 of the first outer frame 44 with the cowl door 38 in a nominal position 38N. The nacelle 22 further includes a distance D2 between the interior surface of the cowl door 38 and the second portion 48 of the first outer frame 44 with the cowl door 38 in a nominal position 38N. As used herein, the term "nominal position" of the cowl door 38 refers to the cowl door 38 in the shut position with no internal or external forces applied to the door (e.g., internal pressure of the fan compartment 36 or external airflow forces). The magnitude of the distance D2 may be greater than the magnitude of the distance D1 during a nominal condition of the cowl door 38 in the shut position. In some embodiments, the distance D1 may be zero during the nominal condition of the cowl door 38 in the shut position (i.e., the cowl door 38 will be in contact with the third portion 50). With the cowl door 38 in the nominal position, the seal 54 may be compressed, at least in part, between the cowl door 38 and the second portion 48.

Figure 4B:
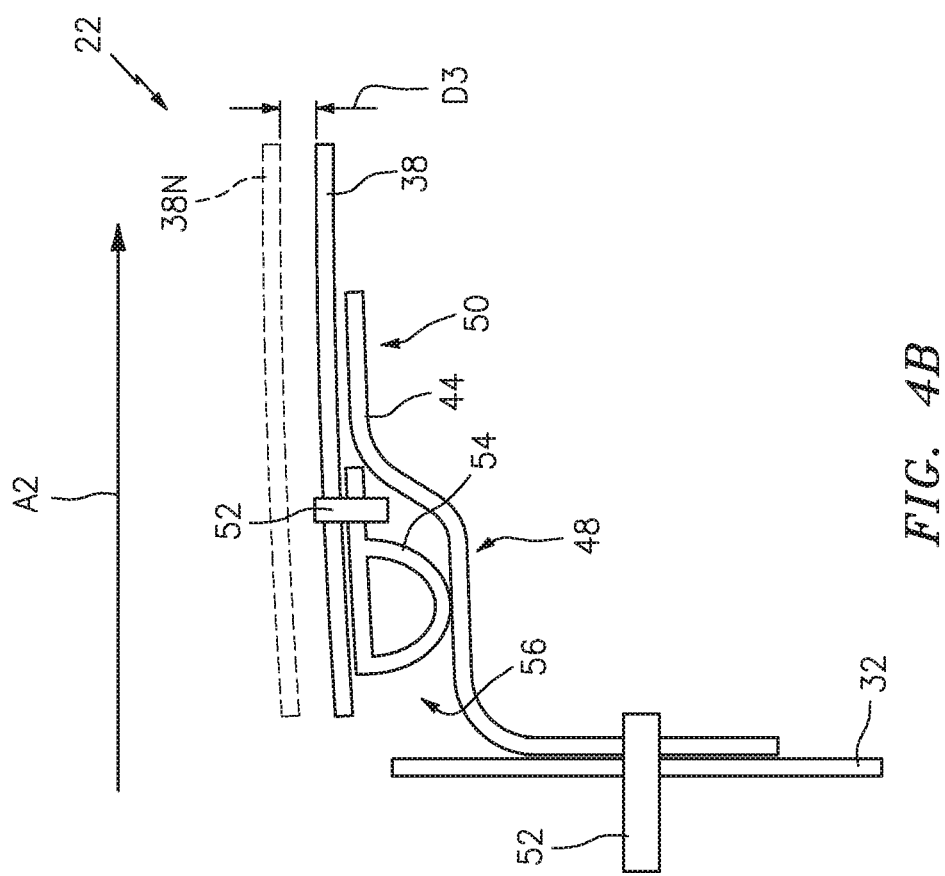
FIG. 4B illustrates a view of the seal arrangement of FIG. 4.
Figure 5:
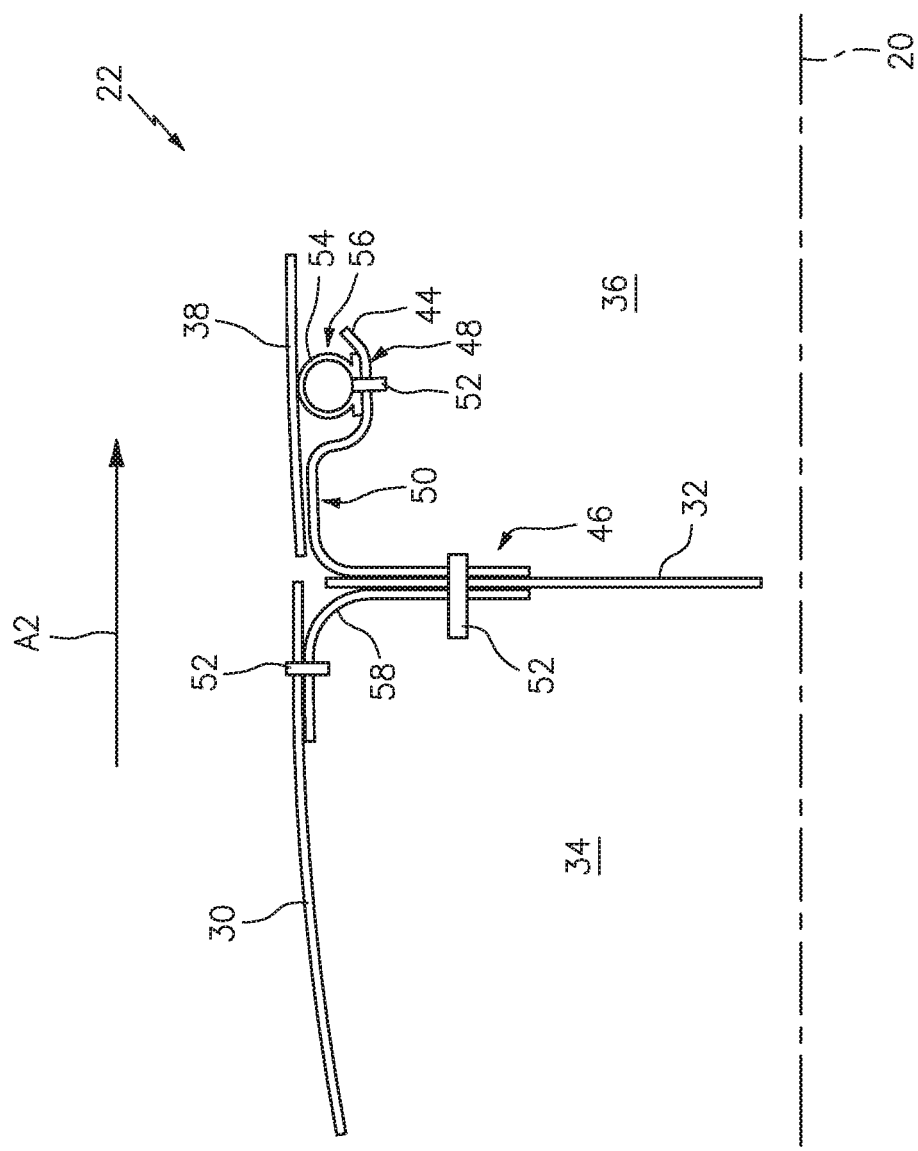
FIG. 5 illustrates another exemplary embodiment of a seal arrangement.

FIG. 4B illustrates a radial compression of the cowl door 38 by, for example, the force of airflow A2 against the exterior of the cowl door 38. Thus, the cowl door 38 is radially inward of the nominal position 38N of the cowl door 38 by a distance D3, thereby further compressing the seal 54 against the second portion 48. The location of the third portion 50 proximate the cowl door 38 may limit the radial compression of the seal 54 between the cowl door 38 and the second portion 48. For example, the third portion 50 (i.e., located a distance D1 from the cowl door (see FIG. 4A)) may physically limit the magnitude of the distance D3 of compression of the seal 54 by contacting the cowl door 38. The limited compression range of the seal 54 may prevent the need for a large external pressure on the cowl door 38 to overcome the seal 54 load in order to latch the cowl door 38.

Figure 4C:
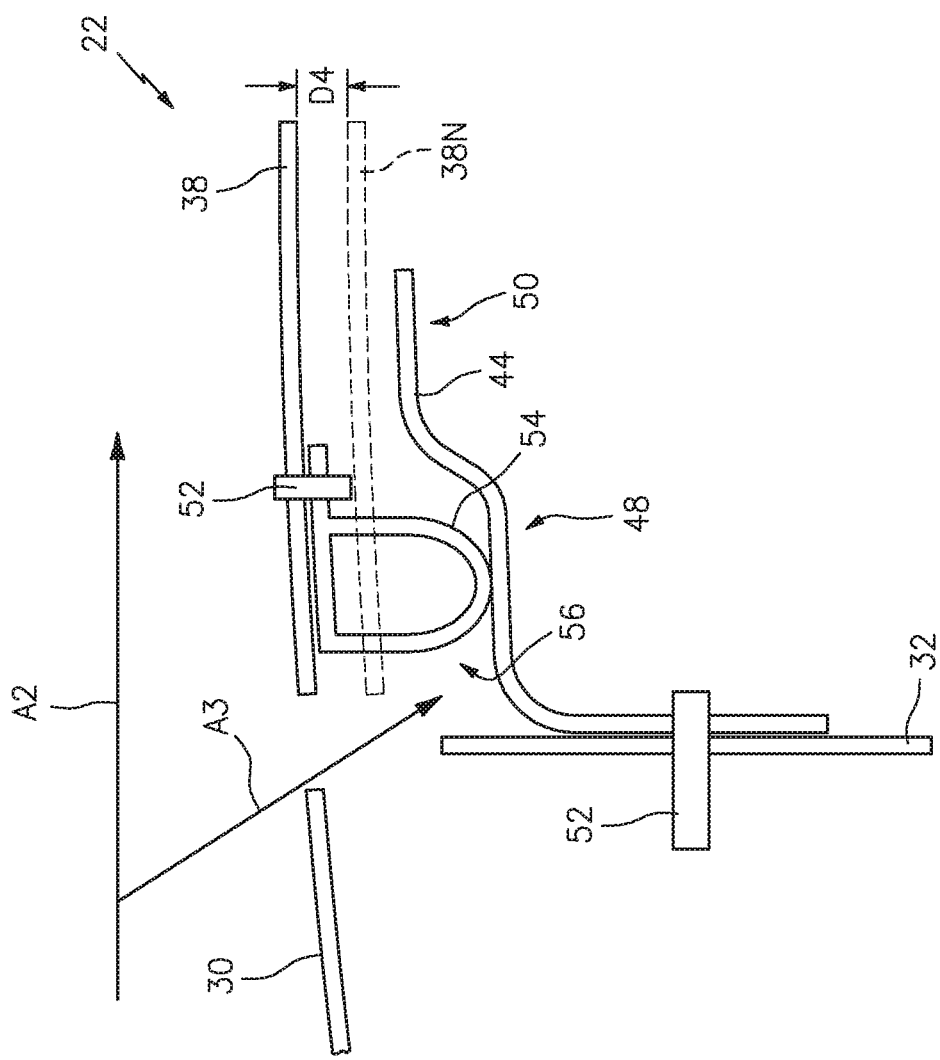
FIG. 4C illustrates a view of the seal arrangement of FIG. 4.

FIG. 4C illustrates an outward radial deflection of the cowl door 38 by, for example, an increase in the internal pressure of the fan compartment 38 or airflow A3 directed between the cowl door 38 and the inlet skin 30. An increase in the internal pressure of the fan compartment 38 may be caused by, for example, a fire, burst duct, or another occurrence within the fan compartment 38. Thus, the cowl door 38 is radially outward of the nominal position 38N of the cowl door 38 by a distance D4. As discussed above, the seal 54 may be compressed between the cowl door 38 and the second portion 48 when the cowl door 38 is in the nominal position 38N. Accordingly, the seal 54 may maintain the seal effect 56 between the cowl door 38 and the second portion during a radially outward deflection of the cowl door 38. For example, the expansion of the seal 54 in response to the radially outward deflection of the cowl door 38 by distance D4 may allow the seal 54 to maintain the seal effect 56. As a result, the seal 54 may reduce or prevent "scooping" of the cowl door 38 which could be caused by airflow external to the nacelle 22 (illustrated as airflow A3) entering the fan compartment 38 by bypassing the cowl door 38.

As previously discussed, an increase in the internal pressure of the fan compartment 38 caused by, for example, a fire, burst duct, or another occurrence within the fan compartment 34 may cause the cowl door 38 to deflect radially outward from its nominal position 38N. Expansion of the seal 54 in response to the radially outward deflection of the cowl door 38 may therefore contain the fire, burst duct, etc. within the fan compartment 34 by maintaining the seal effect 56. Expansion of the seal 54 in response to the radially outward deflection of the cowl door 38 may further reduce or prevent ingress or egress of fluids to or from the fan compartment 36 between the cowl door 38 and the first outer frame 44.

Referring again to FIG. 4, in addition to containing hazardous conditions, such as fires and burst ducts, within the fan compartment 34, in some embodiments, the first outer frame 44 may additionally provide heat shielding to portions of one or more of at least the cowl door 38, the outer barrel 24, the inlet bulkhead 32, the second outer frame 58, and the inlet skin 30. For example, the first outer frame 44 may shield portions of the second outer frame 58 from the heat 60F emitted from fire 60, thereby permitting use of a more lightweight, less heat-resistant material for the second outer frame 58 (e.g., aluminum).

In some embodiments, the first outer frame 44 may be made of a same material as the cowl door 38 such that the first outer frame 44 and the cowl door 38 have a same thermal coefficient of expansion. For example, at least a portion of the first outer frame 44 and the cowl door 38 may be made up a composite material or another material having suitable heat-resistance characteristics. Accordingly, the first outer frame 44 and the cowl door 38 may respond to extreme conditions together (e.g., expansion as a result of heat from a fire or burst duct), thereby preventing or reducing the development of a gap, i.e., an orientation of the cowl door 38, first outer frame 44, or the seal 54, which removes the sealing feature 56. Thus, in some embodiments, the seal effect 56 between the cowl door 38 and the first outer frame 44 may be maintained despite relative movement (i.e., distortion) between the cowl door 38, seal 54, and first outer frame 44 (e.g., as a result of a fire or burst duct within the fan compartment 36).

Referring now to FIG. 5, another embodiment of the first outer frame 44 is illustrated. The components of the nacelle 22 are substantially similar to those discussed above with respect to FIGS. 4 and 4A-C and will not be repeated. As shown in FIG. 5, the third portion 50 may be proximate the inlet bulkhead 32 with respect to the second portion 48. The location of the third portion 50 proximate the cowl door 38 may limit the radial compression of the seal 54 between the cowl door 38 and the second portion 48. As previously discussed, the seal 54 may be any suitable seal to provide the seal effect 56 between the cowl door 38 and the first outer frame 44. As shown in FIG. 5, the seal 56 (i.e., an omega seal) is mounted to the first outer frame 44 between the cowl door 38 and the first outer frame 44, however, the seal 54 could alternatively be mounted to the cowl door 38.

Figure 6:
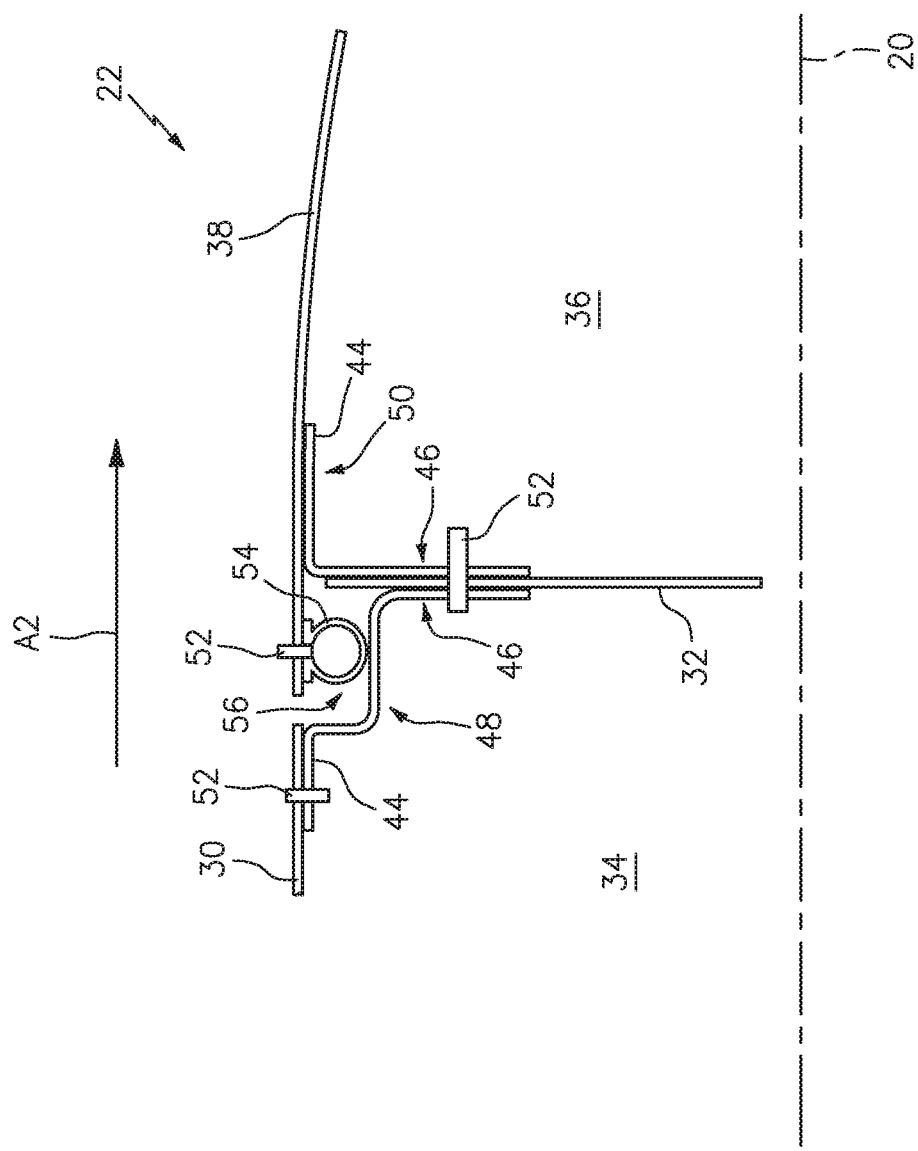
FIG. 6 illustrates another exemplary embodiment of a seal arrangement.

Referring to FIG. 6, another embodiment of the first outer frame 44 is illustrated. Change to first outer frame and second outer frame. The components of the nacelle 22 are substantially similar to those discussed above with respect to FIGS. 4 and 4A-C and will not be repeated. As shown in FIG. 6, the first outer frame 44 may include two or more independent sections. The aft section of the first outer frame 44 includes the first portion 46 mounted to the inlet bulkhead 32 and the third portion 50 proximate the cowl door 38 to limit the radial compression of the seal 54 between the cowl door 38 and the second portion 48. The forward section of the first outer frame 44 includes the first portion 46 mounted to the inlet bulkhead 32 and the second portion 48 disposed opposite the seal 54 from the cowl door 38 when the cowl door 38 is in the closed position to provide the seal effect 56. The forward section of the first outer frame 44 is additionally mounted to the inlet skin 30.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. Accordingly, the present disclosure is not to be restricted except in light of the attached claims and their equivalents.

What is claimed is:

1. A gas turbine engine comprising:
a first outer skin and a second outer skin disposed about an axial centerline of the gas turbine engine and forming portions of a nacelle of the gas turbine engine, the second outer skin comprising at least one cowl door;
a bulkhead extending substantially radially at least a portion of a distance between the axial centerline and one of the first outer skin and the second outer skin;
a first outer frame comprising a first portion, a second portion, and a third portion, the first portion of the outer frame mounted to the bulkhead; and
a seal mounted to one of the at least one cowl door and the second portion,
wherein the at least one cowl door is rotatable between a first position and a second position and wherein in the second position the seal is in contact with the at least one cowl door and the second portion, and
wherein the third portion is configured to limit a compression of the seal between the at least one cowl door and the second portion.

2. The gas turbine engine of claim 1, wherein the seal is configured to form a seal effect between the at least one cowl door and the second portion when the at least one cowl door is in the second position.

3. The gas turbine engine of claim 1, wherein the third portion is spaced from the at least one cowl door a first distance and the second portion is spaced from the at least one cowl door a second distance different than the first distance.

4. The gas turbine engine of claim 3, wherein the second distance is greater than the first distance.

5. The gas turbine engine of claim 1, wherein the at least one cowl door and the first outer frame are made from a same material.

6. The gas turbine engine of claim 1, further comprising a second outer frame mounted to each of the first outer skin and the bulkhead opposite the bulkhead from the first outer frame, the second outer frame annularly disposed about the axis, wherein the second outer frame is made of a different material than the first outer frame and the at least one cowl door.

7. The gas turbine engine of claim 1, wherein the seal is configured to maintain the seal effect during an outward radial deflection of the at least one cowl door.

8. An aircraft comprising:
at least one gas turbine engine, the at least one gas turbine engine comprising:
a first outer skin and a second outer skin disposed about an axial centerline of the at least one gas turbine engine and forming portions of a nacelle of the at least one gas turbine engine, the second outer skin comprising at least one cowl door;
a bulkhead extending substantially radially at least a portion of a distance between the axial centerline and one of the first outer skin and the second outer skin;

a first outer frame comprising a first portion, a second portion, and a third portion, the first portion of the first outer frame mounted to the bulkhead; and a seal mounted to one of the at least one cowl door and the second portion, wherein the at least one cowl door is rotatable between a first position and a second position and wherein in the second position the seal is in contact with the at least one cowl door and the second portion, and wherein the third portion is configured to limit a compression of the seal between the at least one cowl door and the second portion.

9. The aircraft of claim 8, wherein the seal is configured to form a seal effect between the at least one cowl door and the second portion when the at least one cowl door is in the second position.

10. The aircraft of claim 9, wherein the third portion is spaced from the at least one cowl door a first distance and the second portion is spaced from the at least one cowl door a second distance different than the first distance.

11. The aircraft of claim 10, wherein the second distance is greater than the first distance.

\* \* \* \* \*